Oct. 31, 1967 H. FASSBENDER 3,349,713
PROCESS AND DEVICE FOR MIXING LIQUIDS OF DIFFERING VISCOSITIES
Filed Sept. 10, 1965 2 Sheets-Sheet 1
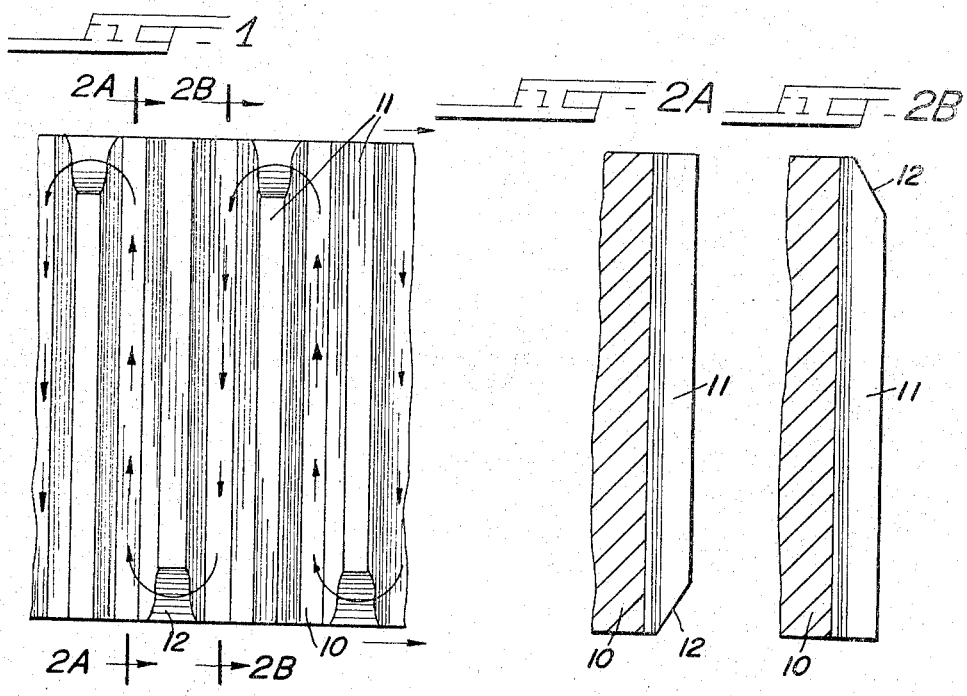
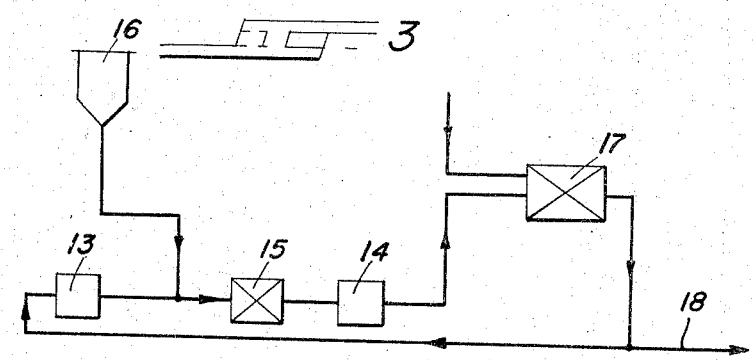
INVENTOR.
HERBERT FASSBENDER
BY
Margall, Johnston, Cook & Root
ATTYS

INVENTOR.
HERBERT FASSBENDER

United States Patent Office 3,349,713
Patented Oct. 31, 1967

3,349,713
PROCESS AND DEVICE FOR MIXING LIQUIDS OF DIFFERING VISCOSITIES
Herbert Fassbender, Bensberg-Refrath, Germany, assignor to Glanzstoff Koln G.m.b.H., Wuppertal, Germany
Filed Sept. 10, 1965, Ser. No. 486,388
Claims priority, application Germany, Sept. 12, 1964, G 41,496
3 Claims. (Cl. 103—6)

ABSTRACT OF THE DISCLOSURE

A method and apparatus for mixing liquids of differing viscosities. The mixing is accomplished by passing the liquids through a gear pump while returning a portion of the liquid from the outlet side to the inlet side of the pump. The returning portion passes transversely through the principal flow of liquid. The teeth of the gear pump are beveled alternately from tooth to tooth which form a steep sinus curve passage for the returning liquid.

---

The present invention relates to a process and device for the continuous mixing and homogenizing of liquids of differing viscosities.

In the production of threads and fibers, for example, according to the viscose process given amounts of dissolved or suspended additives, such as spinning adjuvants or aqueous dyestuff dispersions dissolved in water, frequently have to be distributed uniformly in the viscose. There the work is done generally with so-called stock preparations—that is, the aqueous phase is premixed with viscose in charges, deaerated, and then added in doses as viscose-containing liquid to the spinning viscose. This process has the disadvantage that it requires considerable time and labor and also necessitates largely continuous preparation of the stock preparations, since these, because of their high viscose content, are subject to the ripening process.

Because of these difficulties processes have been developed which make it possible to add aqueous solutions and dispersions directly to the viscose shortly before the spinning machine. The devices used for this purpose, however, are expensive and require considerable maintenance, which has severely limited their use.

Attempts have therefore been made to achieve with simpler means both the uniting of the mixing components in the required quantitative ratio and also their rapid and intensive mixing. For the dosing of the mixture components there has also been proposed an especially expedient pump arrangement. Between two gear wheel pumps which operate with different conveyance performance and of which the first conveys with the lower performance, for example, exclusively viscose, there is drawn in by suction, in correspondence to the conveyance difference, for example, an aqueous dyestuff dispersion. This so-called "difference process" operates satisfactorily, too, with respect to the homogenization of the mixture components on a laboratory scale where it is a matter only of brief spinning times, but under production conditions it presents great difficulties. Liquids differing substantially in viscosity and still incompletely mixed to be conveyed adjacent to one another by the second dosing pump with the greater conveyance performance (delivery) cause frequent jamming of the pump, which is further promoted by the high pigment content of the dyestuff dispersion. Attempts have been made to eliminate this defect by homogenizing the two liquid components with the aid of a mixing device before their entry into the second dosing pump. Continuously operating mixers of correspondingly small size with good efficiency, however, are not as yet available for this purpose.

The principal object of the present invention is to provide a simplified process and apparatus for homogeneously mixing liquids of varying viscosities.

It has been found that liquids of different viscosity can be continuously mixed and completely homogenized if the liquid components are drawn in common in the required quantitative ratio through a pump, the ejection amount per time unit being in consequence of counterpressure, less than its normal volume per time unit, whereby one liquid flow is overlaid by second flow running in sinus windings transversely to it.

As apparatus for the execution of the process there serves a normal gear wheel pump as, for example, a spinning pump. This can be used in simple as well as expedient manner as a continuously operating mixing device for liquids of different viscosity if the teeth of the conveyance wheels on one of its two face ends are beveled alternately from tooth to tooth in each case between right and left side and the pump is allowed to work against excess pressure. In this manner the successively following tooth gaps are connected to one another to form a passage running in a steep sinus curve, through which excessively conveyed compressed amount of liquid can flow back in counterflow from the pressure chamber into the suction chamber of the pump. A complete permeation of the conveyed and back-flowing liquid is achieved as the back-flow partially dislodges the conveyed fluid between the teeth.

The mixing effect of the gear wheel pump according to the invention is due essentially to the returning of a part of the conveyed amount of liquid under pressure and contrary to the turning direction of the gear wheels through the tooth gaps connected into passages of the conveyer wheels. The one-sided beveling of the teeth of the conveyer wheels, alternating between right and left face end is thus essential to the invention in that it causes the formation of the passage. It differs thereby fundamentally from the known beveling of the teeth in gear wheel conveyer pumps, undertaken for the purpose of reducing friction, which brings it about that between running surfaces and tooth crest a liquid wedge forms, from which liquid is constantly pressed between the running surfaces. A back-flow during simultaneous mixing of the entire conveyed liquid is, in this arrangement, impossible and is not intended. Likewise, the known gear wheel pump for conveyance media of high temperature, in which the width of the teeth is smaller than that of the gear wheel body is not related in any way to the present invention.

The generation of counterpressure in the gear wheel mixer pump according to the invention is possible in various ways. Either the liquid outlet of the pump is provided with a choke valve or else the gear wheel mixer pump is allowed to work against a pump with lower delivery.

The last-mentioned manner of operation proves especially expedient for the continuous addition of dyestuff dispersions to the viscose directly before the spinning machine, because the necessary initial pressure is simultaneously generated on the dosing pump engaged on outlet side of the gear wheel pump. In this case the gear wheel mixer pump and the two dosing pumps engaged before and after are driven in common by the pump drive shaft of the spinning machine and form a closed dosing block with one drive. The relative delivery of the gear wheel mixer pump lies about 30 to 100% higher than that of the dosing pump engaged on outlet side.

Besides for the working in of liquid additives in spinning fluids such as viscose, the gear wheel mixer pump according to the invention is also suited for the production of more or less viscous liquid mixtures of any type, such as color pastes, creams, finishing agents, and the like.

A preferred embodiment of the invention is illustrated in the attached drawing wherein:

FIGURE 1 is a segmented plan view of the conveyer wheel of a gear wheel mixer pump;

FIGURES 2A and 2B are sectional views of two gear teeth, which views are taken along lines 2A–2A and 2B–2B of FIG. 1;

FIGURE 3 is a switching diagram for the mixing pump as it is used, for example, in the production of colored viscose spinning solutions;

Figure 4:
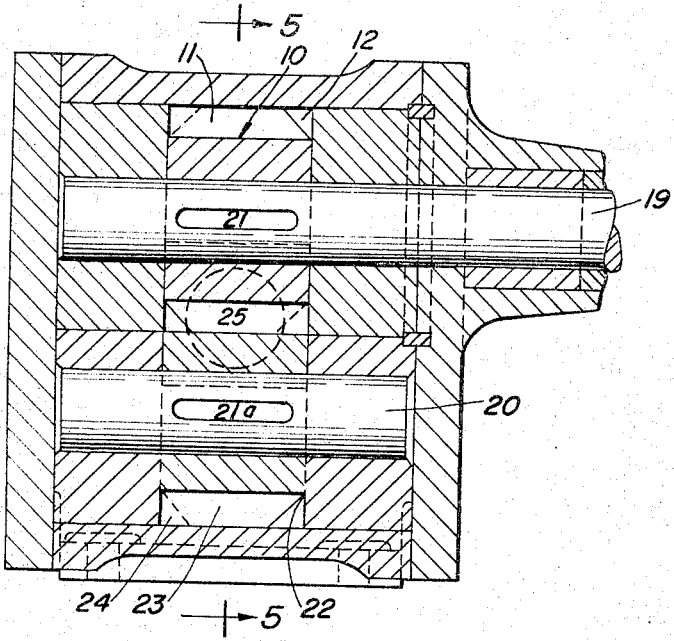
FIGURE 4 is an open cross-sectional view of the gear wheel mixer pump.

In FIG. 1, gear wheel 10 is shown as including gear teeth 11 and beveled passage section 12. When the gear wheel turns in a clockwise direction back pressure forces a portion of the solution through the passageway defined by the arrows. The gear teeth are beveled alternately to the left and to the right on their end faces.

In FIGS. 2A and 2B, gear wheel 10 is shown as including teeth 11 and beveled section 12.

FIG. 3 shows a typical switching diagram wherein the mixing pump is used to produce colored viscose spinning solutions. In the diagram, dosing pumps 13 and 14 are shown on either side of gear wheel mixer pump 15. Dyestuff is passed from container 16 into the viscose solution. Character 17 designates a viscose mixer while line 18 is connected to the viscose ring passage of the spinning machine. In this embodiment the back pressure on gear wheel mixer 15 is created by maintaining the relative delivery of the gear wheel mixer pump substantially higher than that of dosing pump 14. Preferably, the relative delivery of the gear wheel mixer pump is about 30 to 100% higher than that of dosing pump 14.

In FIG. 4, gear 10 is shown as including alternately beveled sections 12 of gear teeth 11. Drive shaft 19 turns gear wheel 10 which in turn drives driven shaft 20. Keylocks 21 and 21a fix the shafts to the gear wheels. Gear wheel 22 is shown as including gear teeth 23 and alternately beveled sections 24 of gear teeth 23. The rotation of the gear wheels forces the solution through passageway 25.

Figure 5:
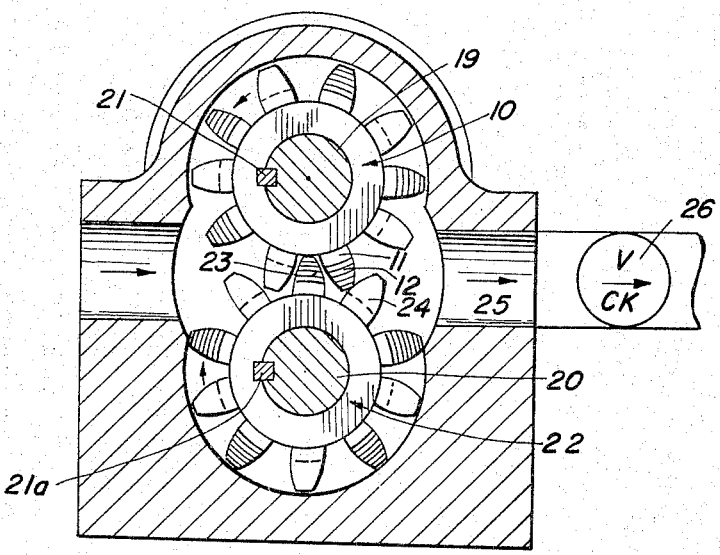
FIGURE 5 is an open elevational view showing the gear wheel mixer pump.

In FIG. 5, gear teeth 11 are shown meshing with gear teeth 23. This view also shows the relationship existing between alternately beveled sections 12 and 24 of the gear teeth. With the gear wheels rotating in the direction shown in this figure, viscose fluid is forced through passage 25 from the left to the right hand side of the wheel assembly. In the embodiment shown in FIG. 5, check valve 26 is used to maintain a back pressure on the fluid passing through line 25. The delivery of the gear wheel mixer pump should be about 30 to 100% higher than the amount of liquid flowing out passage 25 through check valve 26.

Obviously many modifications and variations of the invention as hereinbefore set forth may be made without departing from the spirit and scope thereof, and therefore only such limitations should be imposed as are indicated in the appended claims.

I claim:

1. A process for the continuous mixing and homogenizing of liquids of different viscosity which comprises: passing the liquid components in the required quantitative ratio from the inlet side to the exit side of a mixing pump in a common stream; controlling the amount of fluid ejected from the principal flow of liquid per unit time by means of counter-pressure such that the ejected liquid is smaller than the normal volume per unit time ejected by said pump, and continuously passing a portion of said liquid transversely through the principal flow of said liquid in a sinus winding.

2. A device for the continuous mixing and homogenizing of liquids of different viscosity which comprises: a gear wheel pump characterized by the feature that the teeth of the conveyer wheels of the pump are beveled on one of their two ends alternately to the right and left side from tooth to tooth, and the liquid outlet of the pump is partially blocked by flow limiting means.

3. A device for the continuous mixing and homogenizing of liquids of differing viscosities according to claim 2, which includes a dosing pump engaged both before and after said gear wheel mixer pump, in each case of lower delivery than said gear wheel mixing pump, said pumps being combined into a commonly driven dosing block in such a way that the afterengaged dosing pump, having a higher delivery rate as compared to the foreengaged dosing pump determines the proportion of the liquid component fed from a high tank into the suction line before the gear wheel mixer pump.

References Cited

UNITED STATES PATENTS

| 2,116,380 | 5/1938 | Bauer | 259—6 X |
| 2,159,744 | 5/1939 | Maglott | 103—128 X |
| 2,391,973 | 1/1946 | Hunter | 103—126 X |
| 2,601,003 | 6/1952 | Pontius | 103—126 |

FOREIGN PATENTS

| 932,882 | 9/1955 | Germany. |

DONLEY J. STOCKING, *Primary Examiner.*

WILLIAM L. FREEH, *Examiner.*